United States Patent
Sun et al.

(10) Patent No.: US 10,530,778 B2
(45) Date of Patent: Jan. 7, 2020

(54) COLLABORATION BASED ACCESS CONTROL LIST (ACL)

(71) Applicant: International Business Machines Corporation, Armonk, NY (US)

(72) Inventors: Lin Sun, Cary, NC (US); Liam S. Harpur, Skerries (IE); Lisa Marie Wood Bradley, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

(21) Appl. No.: 15/814,793

(22) Filed: Nov. 16, 2017

(65) Prior Publication Data
US 2019/0149549 A1    May 16, 2019

(51) Int. Cl.
*H04L 29/06*    (2006.01)
*G06F 21/60*    (2013.01)
(Continued)

(52) U.S. Cl.
CPC ............ *H04L 63/101* (2013.01); *G06F 21/40* (2013.01); *G06F 21/604* (2013.01); *G06F 21/62* (2013.01);
(Continued)

(58) Field of Classification Search
CPC ..................................................... H04L 63/101
See application file for complete search history.

(56) References Cited

U.S. PATENT DOCUMENTS 8,826,390 B1 *  9/2014  Varda ................. G06F 21/6218
                                                        726/4
9,219,735 B2 * 12/2015  Hoard ................. H04L 63/0428
(Continued)

FOREIGN PATENT DOCUMENTS

WO       20160022037 A1    2/2016

OTHER PUBLICATIONS

National Institute of Standards and Technology; The NIST Definition of Cloud Computing; Special Publication 800-145; Dec. 13, 2016; pp. M-7 to M-13.

*Primary Examiner* — Kambiz Zand
*Assistant Examiner* — Thanh H Le
(74) *Attorney, Agent, or Firm* — Garlick & Markison; Timothy W. Markison; Shayne X. Short

(57) ABSTRACT

A computing device includes an interface configured to interface and communicate with a communication system, a memory that stores operational instructions, and processing circuitry, coupled to the interface and memory, that is configured to execute the operational instructions to perform various operations. The computing device generates collaboration data between an owner/user and other user(s) based on existing data content on the computing device and processes the collaboration data to generate collaboration measure(s) associated with the other user(s). The computing device generates an access control list (ACL) that specifies access level(s) for the other user(s). Based on a user request associated with a user to access the existing data content and/or application(s) on the computing device, the computing device determines identity of the user. When the user associated qualifies for access, the computing device selectively authorizes access to access at least some of the existing data content and/or application(s).

20 Claims, 6 Drawing Sheets

(51) Int. Cl.
*G06F 21/62* (2013.01)
*G06F 21/40* (2013.01)
*G06Q 50/00* (2012.01)

(52) U.S. Cl.
CPC ........... *G06Q 50/01* (2013.01); *H04L 63/102* (2013.01); *H04L 63/105* (2013.01); *H04L 63/08* (2013.01)

(56) References Cited

U.S. PATENT DOCUMENTS

| | | |
|---|---|---|
| 9,396,341 B1 * | 7/2016 | Chandra .............. G06F 16/1748 |
| 2015/0221147 A1 | 8/2015 | Daniel-Wayman et al. |
| 2017/0142124 A1 * | 5/2017 | Mukhin .................. G06F 21/30 |

* cited by examiner

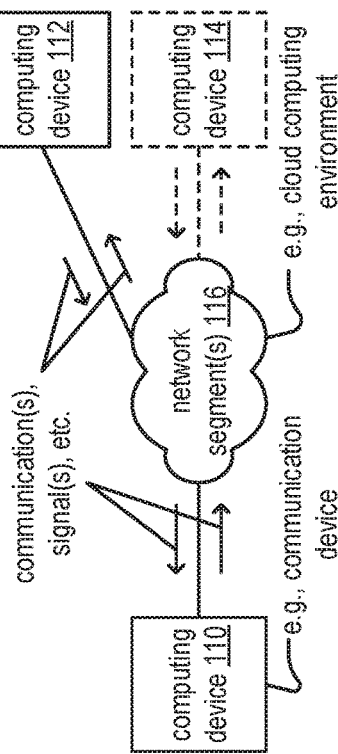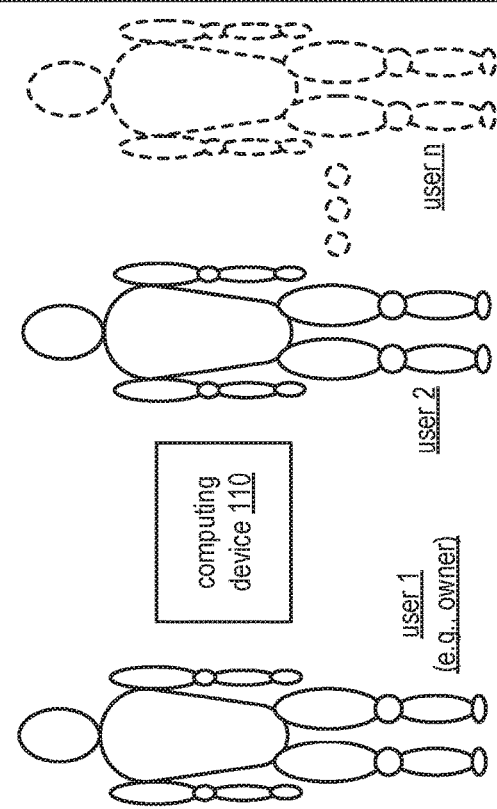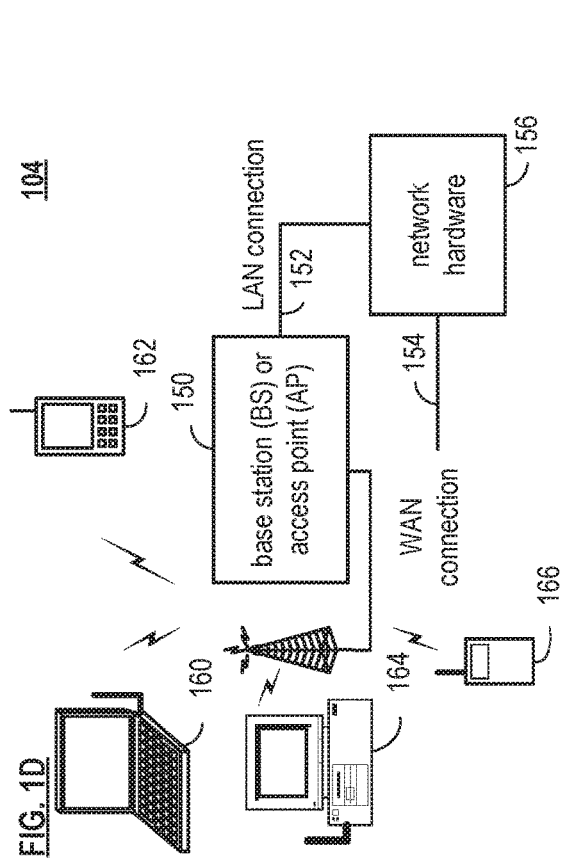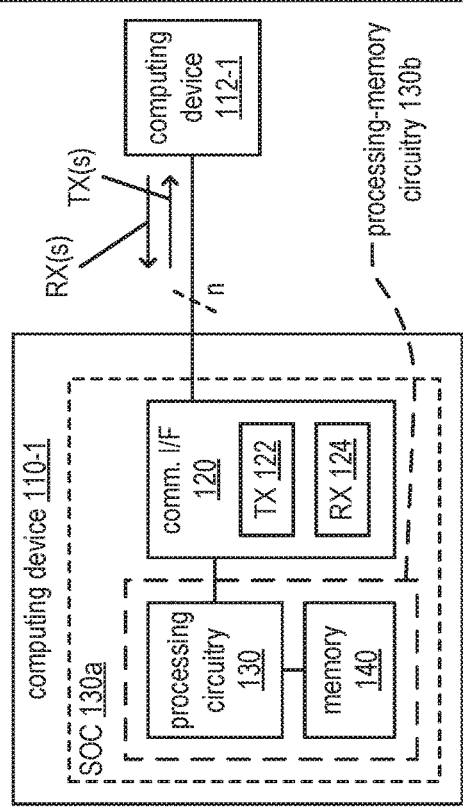

COLLABORATION BASED ACCESS CONTROL LIST (ACL)

BACKGROUND

This invention relates to access control list (ACL) technology related to computing devices, and more specifically, to collaboration based ACL generation and operation technology related to computing devices.

In the prior art, an ACL may be used as a basis to determine which users may access a computing device. For example, when an owner of a computing device is setting up a computing device, the owner may enter information and set up accounts for owner-authorized users. Such operations can be time-consumptive and labor-intensive. In addition, such a prior art ACL is managed by a user (e.g., an owner, a supervisor, account manager, etc. of the computing device) and necessarily requires user-interaction whenever a change to the ACL is to be made.

In some instances, when a user desires to grant access to the user's computing device, the user will logon to the computing device and then provide full access to the computing device to another user. However, there may be situations in which the owner of the computing device prefers not to grant access to the entirety of the computing device to this other user. The prior art fails to provide solutions for effective management and control of such ACLs.

SUMMARY

Embodiments of the present invention disclose a computer-implemented method, a system, and a computer program product for collaboration based ACL generation and operation. Collaboration data between an owner of the computing device and a plurality of other users is generated based on existing data content on the computing device. This collaboration data may be generated based on existing data content (e.g., such as on a computing device associated with a user and/or owner of the computing device and/or the plurality of other users, social media associated with the user and/or owner of the computing device and/or the plurality of other users, etc.). The collaboration data is processed to generate a plurality of collaboration measures associated with the plurality of other users. This collaboration data may be generated based on existing data content (e.g., such as on a computing device associated with a user and/or owner of the computing device and/or the plurality of other users, social media associated with the user and/or owner of the computing device and/or the plurality of other users, etc.).

An access control list (ACL) that specifies a plurality of access levels for the plurality of other users is generated based on the plurality of collaboration measures. Then, based on a user request associated with a user of the plurality of other users to access existing data content on the computing device and/or one or more applications (e.g., such as on the computing device), the identity of the user associated with the user request is determined. When the user associated with the user request qualifies for at least some access to the computing device based on the identity of the user associated with the user request and the ACL, selective access to at least one of a portion of the existing data content on the computing device and/or at least one application of the one or more applications is authorized to the user associated with the user request in accordance with a corresponding access level of the plurality of access levels specified by the ACL that is associated with the user associated with the user request.

BRIEF DESCRIPTION OF THE DRAWINGS

FIG. 1A is a diagram illustrating an embodiment of a computing device according to various embodiments of the present invention;

FIG. 1B is a diagram illustrating an embodiment of one or more communication systems according to various embodiments of the present invention;

FIG. 1C is a diagram illustrating an embodiment of a computing device configured to be operate within one or more communication systems according to various embodiments of the present invention;

FIG. 1D is a diagram illustrating an embodiment of a wireless communication system according to various embodiments of the present invention;

DETAILED DESCRIPTION

Figure 2A:
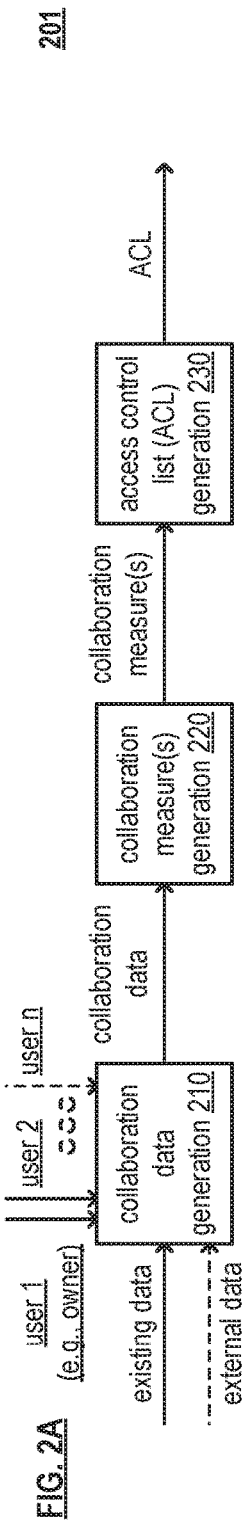
FIG. 2A is a diagram illustrating an embodiment of access control list (ACL) generation related functionality and processing according to various embodiments of the present invention.

According to an embodiment of the present invention, a novel collaboration based ACL generation and operation involves generating collaboration data between an owner of the computing device and a plurality of other users based on existing data content on the computing device. This novel collaboration based ACL generation and operation also involves processing the collaboration data to generate a plurality of collaboration measures associated with the plurality of other users. Also, this novel collaboration based ACL generation and operation involves generating, based on the plurality of collaboration measures, an access control list (ACL) that specifies a plurality of access levels for the plurality of other users. Then, based on a user request associated with a user of the plurality of other users to access at least one of the existing data content on the computing device or one or more applications on the computing device, this novel collaboration based ACL generation and operation also involves determining identity of the user associated with the user request. When the user associated with the user request qualifies for at least some access to the computing device based on the identity of the user associated with the user request and the ACL, this novel collaboration based ACL generation and operation also involves selectively authorizing access to at least one of a portion of the existing data content on the computing device or at least one application of the one or more applications on the computing device to the user associated with the user request in accordance with a corresponding access level of the plurality of access levels specified by the ACL that is associated with the user associated with the user request.

FIG. 1A is a diagram illustrating an embodiment 101 of a computing device 110 according to various embodiments of the present invention. The computing device 110 is accessible via at least one user (e.g., user 1, such as an owner of the computing device 110) via one or more means (e.g., log on of the user 1, username and password of the user 1, photo identify of the user 1, fingerprint of the user 1, name of the user 1, email address of the user 1, password of the user 1, facial scan of the user 1, email login information 1, and/or social media login information of the user 1, and/or any other form of verification, authentication, etc.). The computing device 110 also includes existing data content stored therein (e.g., in a memory of the computing device 110). In addition, the user 1 is associated with one or more other users (e.g., including a user 2 and optionally up to a user n, where n is a positive integer greater than or equal to 2).

In an example of operation and implementation, a computing device 110 includes an interface configured to interface and communicate with a communication system, memory that stores operational instructions, and processing circuitry operably coupled to the interface and to the memory to perform various operations, functions, etc. including transmitting and receiving of signals, processing of signals, etc. For example, the computing device 110 is configured to generate collaboration data between user 1 (e.g., an owner of the computing device 110) and one or more other users based on existing data content on the computing device 110. The computing device 110 is also configured to process the collaboration data to generate one or more collaboration measures associated with the one or more other users. Then, the computing device 110 is configured to generate, based on the one or more collaboration measures, an access control list (ACL) that specifies one or more access levels for the one or more other users. Based on a user request associated with a user of the one or more other users to access at least one of the existing data content on the computing device 110 or one or more applications on the computing device 110, the computing device 110 is configured to determine identity of the user associated with the user request. Then, when the user associated with the user request qualifies for at least some access to the computing device 110 based on the identity of the user associated with the user request and the ACL, the computing device 110 is configured selectively to authorize access to at least one of a portion of the existing data content on the computing device 110 or at least one application of the one or more applications on the computing device 110 to the user associated with the user request in accordance with a corresponding access level of the one or more access levels specified by the ACL that is associated with the user associated with the user request.

FIG. 1B is a diagram illustrating an embodiment 102 of one or more communication systems according to various embodiments of the present invention. One or more network segments 116 provide communication inter-connectivity for at least two computing devices 110 and 112 (e.g., such computing devices may be implemented and operative to support communications with other computing devices in certain examples, and such computing devices may alternatively be referred to as communication devices in such situations including both computing device and communication device functionality and capability). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. In general, the one or more network segments 116 may be implemented to support a wireless communication system, a wire lined communication system, a non-public intranet system, a public internet system, a local area network (LAN), a wireless local area network (WLAN), a wide area network (WAN), a satellite communication system, a fiber-optic communication system, and/or a mobile communication system. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 110-114 may be of a variety of types of devices including stationary devices, mobile devices, portable devices, etc. and may support communications for any of a number of services or service flows including data, telephony, television, Internet, media, synchronization, etc.

In an example of operation and implementation, device 110 includes a communication interface to support communications with one or more of the other devices 112-114. In an example, the computing device 110 includes a communication interface configured to interface and communicate with a communication network (e.g., the one or more network segments 116), memory that stores operational instructions, and a processor coupled to the communication interface and to the memory. The processor is configured to execute the operational instructions to perform various functions, operations, etc. Note that the communication supported by the computing device 110 may be bidirectional/to and from the one or more of the other computing devices 112-114 or unidirectional (or primarily unidirectional) from the one or more of the other computing devices 112-114.

In one example, computing device 110 includes a processor that generates, modulates, encodes, etc. and transmits signals via a communication interface of the computing device 110 and also receives and processes, demodulates, decodes, etc. other signals received via the communication interface of the computing device 110 (e.g., received from other computing devices such as computing device 112, computing device 114, etc.).

Note also that the communication interface 120 may include functionality to support receipt of user input and output user output (e.g., via a touchscreen, a keyboard, audio and/or video input/output ports, etc.) to facilitate interaction with one or more users of the computing device 110-1. Such functionality is implemented separately from the communication interface 120 in some examples and is integrated into the communication interface 120 in other examples.

In an example of operation, computing device 110 is configured to generate collaboration data between an owner of the computing device and a plurality of other users based on existing data content on the computing device and to process the collaboration data to generate a plurality of collaboration measures associated with the plurality of other users. The computing device 110 is configured to generate, based on the plurality of collaboration measures, an access control list (ACL) that specifies a plurality of access levels for the plurality of other users. Then, based on a user request associated with a user of the plurality of other users to access at least one of the existing data content on the computing device or one or more applications on the computing device, the computing device 110 is configured to determine identity of the user associated with the user request. When the user associated with the user request qualifies for at least some access to the computing device based on the identity of the user associated with the user request and the ACL, the computing device 110 is configured selectively to authorize access to at least one of a portion of the existing data content on the computing device or at least one application of the one or more applications on the computing device to the user associated with the user request in accordance with a corresponding access level of the plurality of access levels specified by the ACL that is associated with the user associated with the user request.

FIG. 1C is a diagram illustrating an embodiment 103 of a computing device configured to be operate within one or more communication systems according to various embodiments of the present invention. The computing device 110-1 includes a communication interface 120 and processing circuitry 130. The communication interface 120 includes functionality of a transmitter 122 and a receiver 124 to support communications with one or more other devices within a communication system. The computing device 110-1 may also include memory 140 to store information including one or more signals generated by the computing device 110-1 or such information received from other devices (e.g., computing device 112) via one or more communication channels. For example, memory 140 may also include and store various operational instructions for use by the processing circuitry 130 in regards to the processing of messages and/or other received signals and generation of other messages and/or other signals including those described herein (e.g., image and/or video signals). Memory 140 may also store information including one or more types of encoding, one or more types of symbol mapping, concatenation of various modulation coding schemes, etc. as may be generated by the computing device 110-1 or such information received from other devices via one or more communication channels. The communication interface 120 supports communications to and from one or more other devices (e.g., computing device 112-1 and/or other computing devices). Memory 140 may also store information including one or more types of video and/or image processing in accordance with the various aspects, embodiments, and/or examples, and their equivalents, described herein.

Operation of the communication interface 120 may be directed by the processing circuitry 130 such that processing circuitry 130 transmits and receives signals (TX(s) and RX(s)) via the communication interface 120. Generally speaking, computing device 110-1 is able to support communications with one or more other computing device within one or more communication systems including computing device 112-2.

A computing device 110-1 (e.g., which may be any one of computing devices 110, 112, or 114 as with reference to FIG. 1B) is in communication with another computing device 112-1 (and/or any number of other wireless computing devices) via a communication medium. The computing device 110-1 includes a communication interface 120 to perform transmitting and receiving of at least one signal, symbol, packet, and/or frame, etc. (e.g., using a transmitter 122 and a receiver 124) (note that general reference to packet or frame may be used interchangeably).

Generally speaking, the communication interface 120 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the computing device 110-1 operates), equalization, pre-equalization, metric generation, symbol mapping and/or de-mapping, automatic gain control (AGC) operations, and/or any other operations that may be performed by an AFE and/or PHY component within a computing device.

In some implementations, the computing device 110-1 also includes a processing circuitry 130, and an associated memory 140, to execute various operations including interpreting at least one signal, symbol, packet, and/or frame transmitted to computing device 112-1 and/or received from the computing device 112-1 and/or any other computing device. The computing devices 110-1 and 112-1 may be implemented using at least one integrated circuit in accordance with any desired configuration or combination of components, modules, etc. within at least one integrated circuit. Also, the computing devices 110 and/or 112 may each include one or more antennas for transmitting and/or receiving of at least one packet or frame wirelessly (e.g., computing device 110-1 may include m antennas, and computing device 112-1 may include n antennas, where m and n are positive integers).

Also, in some examples, note that one or more of the processing circuitry 130, the communication interface 120 (including the TX 122 and/or RX 124 thereof), and/or the memory 140 may be implemented in one or more "processing modules," "processing circuits," "processors," and/or "processing units" or their equivalents. Considering one example, a system-on-a-chip (SOC) 130a may be implemented to include the processing circuitry 130, the communication interface 120 (including the TX 122 and/or RX 124 thereof), and the memory 140 (e.g., SOC 130a being a multi-functional, multi-module integrated circuit that includes multiple components therein). Considering another example, processing-memory circuitry 130b may be implemented to include functionality similar to both the processing circuitry 130 and the memory 140 yet the communication interface 120 is a separate circuitry (e.g., processing-memory circuitry 130b is a single integrated circuit that performs functionality of a processing circuitry and a memory and is coupled to and also interacts with the communication interface 120).

Considering even another example, two or more processing circuitries may be implemented to include the processing circuitry 130, the communication interface 120 (including the TX 122 and/or RX 124 thereof), and the memory 140. In such examples, such a "processing circuitry," "processing circuitry," or "processing circuitries" (or "processor" or "processors") is/are configured to perform various operations, functions, communications, etc. as described herein. In general, the various elements, components, etc. shown within the computing device 110-1 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the computing device 110-1 includes both processing circuitry 130 and communication interface 120 configured to perform various operations. In other examples, the computing device 110-1 includes SOC 130a configured to perform various operations. In even other examples, the computing device 110-1 includes processing-memory circuitry 130b configured to perform various operations. Generally, such operations include generating, transmitting, etc. signals intended for one or more other computing device (e.g., computing device 112-1) and receiving, processing, etc. other signals received for one or more other devices (e.g., computing device 112-1).

In some examples, note that the communication interface 120, which is coupled to the processing circuitry 130, is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the computing device 110-1 may be communicated via any of these types of communication systems.

Note that computing device 110-1 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system, among other types of communication systems.

In an example of operation and implementation, a computing device includes a communication interface 120 configured to interface and communicate with a communication network, memory 140 that stores operational instructions, and processing circuitry 130 coupled to the communication interface and to the memory.

The processing circuitry 130 is configured to execute the operational instructions to perform various functions, operations, and processes (sometimes in cooperation with the communication interface 120 and/or the memory 140). In an example, the processing circuitry 130 is configured to generate collaboration data between an owner of the computing device and a plurality of other users based on existing data content on the computing device. The processing circuitry 130 is also configured to process the collaboration data to generate a plurality of collaboration measures associated with the plurality of other users and to generate, based on the plurality of collaboration measures, an access control list (ACL) that specifies a plurality of access levels for the plurality of other users. Based on a user request associated with a user of the plurality of other users to access at least one of the existing data content on the computing device or one or more applications on the computing device, the processing circuitry 130 is also configured to determine identity of the user associated with the user request. When the user associated with the user request qualifies for at least some access to the computing device based on the identity of the user associated with the user request and the ACL. The processing circuitry 130 is also configured selectively to authorize access to at least one of a portion of the existing data content on the computing device or at least one application of the one or more applications on the computing device to the user associated with the user request in accordance with a corresponding access level of the plurality of access levels specified by the ACL that is associated with the user associated with the user request.

FIG. 1D is a diagram illustrating an embodiment 100 of a wireless communication system according to various embodiments of the present invention. The wireless communication system includes one or more base stations and/or access points 150, wireless communication devices 160-166 (e.g., wireless stations (STAs)), and a network hardware component 156. The wireless communication devices 160-166 may be laptop computers, or tablets, 160, personal digital assistants 162, personal computers 164 and/or cellular telephones 166 (and/or any other type of wireless communication device). Other examples of such wireless communication devices 160-166 could also or alternatively include other types of devices that include wireless communication capability (and/or other types of communication functionality such as wired communication functionality, satellite communication functionality, fiber-optic communication functionality, etc.). Examples of wireless communication devices may include a wireless smart phone, a cellular phone, a laptop, a personal digital assistant, a tablet, a personal computers (PC), a work station, or a video game device.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The one or more base stations (BSs) or access points (APs) 150 are operably coupled to the network hardware 156 via local area network connection 152. The network hardware 156, which may be a router, switch, bridge, modem, system controller, etc., provides a wide area network connection 154 for the communication system. Each of the one or more base stations or access points 150 has an associated antenna or antenna array to communicate with the wireless communication devices in its area. Typically, the wireless communication devices register with a particular base station or access point 150 to receive services from the communication system. For direct connections (i.e., point-to-point communications), wireless communication devices communicate directly via an allocated channel.

Any of the various wireless communication devices (WDEVs) 160-166 and one or more BSs or APs 150 may include a processing circuitry and/or a communication interface to support communications with any other of the wireless communication devices 160-166 and one or more BSs or APs 150. In an example of operation, a processing circuitry and/or a communication interface implemented within one of the devices (e.g., any one of the WDEVs 160-166 and one or more BSs or APs 150) is/are configured to process at least one signal received from and/or to generate at least one signal to be transmitted to another one of the devices (e.g., any other one of the one or more WDEVs 160-166 and one or more BSs or APs 150).

Note that general reference to a communication device, such as a wireless communication device (e.g., WDEVs) 160-166 and one or more BSs or APs 150 in FIG. 1D, or any other communication devices and/or wireless communication devices may alternatively be made generally herein using the term 'device' (e.g., "device" when referring to "wireless communication device" or "WDEV"). Generally, such general references or designations of devices may be used interchangeably.

The processing circuitry and/or the communication interface of any one of the various devices, WDEVs 160-166 and one or more BSs or APs 150, may be configured to support communications with any other of the various devices, WDEVs 160-166 and one or more BSs or APs 150. Such communications may be uni-directional or bi-directional between devices. Also, such communications may be uni-directional between devices at one time and bi-directional between those devices at another time.

In an example, a device (e.g., any one of the WDEVs 160-166 and one or more BSs or APs 150) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 160-166 and one or more BSs or APs 150) includes a processing circuitry to support communications with one or more of the other wireless communication devices (e.g., any other of the WDEVs 160-166 and one or more BSs or APs 150). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 160-166 and one or more BSs or APs 150) includes a processing circuitry, a communication interface, and a memory configured to support communications with one or more of the other wireless communication devices (e.g., any other of the WDEVs 160-166 and one or more BSs or APs 150).

In an example of operation and implementation, any one of the WDEVs 160-166 such as WDEV 160 is configured to generate collaboration data between an owner of the computing device and a plurality of other users based on existing data content on the computing device. The WDEV 160 is also configured to process the collaboration data to generate a plurality of collaboration measures associated with the plurality of other users and to generate, based on the plurality of collaboration measures, an access control list (ACL) that specifies a plurality of access levels for the plurality of other users. Based on a user request associated with a user of the plurality of other users to access at least one of the existing data content on the computing device or one or more applications on the computing device, the WDEV 160 is also configured to determine identity of the user associated with the user request. When the user associated with the user request qualifies for at least some access to the computing device based on the identity of the user associated with the user request and the ACL, The WDEV 160 is also configured selectively to authorize access to at least one of a portion of the existing data content on the computing device or at least one application of the one or more applications on the computing device to the user associated with the user request in accordance with a corresponding access level of the plurality of access levels specified by the ACL that is associated with the user associated with the user request.

FIG. 2A is a diagram illustrating an embodiment 201 of access control list (ACL) generation related functionality and processing according to various embodiments of the present invention. Various aspects, embodiments, and/or examples of the invention provides a novel approach by which the system is configured to generate collaboration statistics for one or more new users with no ACL for that computing device. For example, based on the collaboration statistics of the user among the contents related to the user on the device, novel approach of authorization is also configured to provide selective authorization to the computing device or deny access to the computing device. In some examples, the novel approach of authorization is also configured to leverage the generated collaboration statistics to determine the corresponding ACL the system should grant to the user temporarily. The novel approach of authorization is also configured to will thus grant the user with the corresponding ACL to enable the user to access the given device and restricted applications on the device.

In an example of operation and implementation, the ACL generation related functionality and processing operates by performing collaboration data generation 210 to generate collaboration data between two or more users (e.g., a user 1 such as an owner of the computing device and one or more other users such as user 2 up to a user n) based on existing data content on the computing device. In some examples, additional data such as external data (e.g. stored in accordance with a cloud computing environment, one or more remote data storage units (SUs), etc.). In some examples, the external data includes social media associated with a user and/or owner (e.g., of a computing device) and/or the plurality of other users. For example, social media information related to one or more users may be locally stored (e.g., on a computing device associated with a user and/or owner thereof) and/or remotely stored one or more remote social media servers within a communication system such as one that includes the one or more network segments 116. The collaboration data generation 210 operates to generate collaboration data between an owner of the computing device and a plurality of other users based on existing data content on the computing device (and/or external data).

The ACL generation related functionality and processing then operates by performing collaboration measure(s) generation 220 to process the collaboration data to generate one or more collaboration measures associated with the plurality of other users. Then, based on the plurality of collaboration measures, the ACL generation related functionality and processing then operates by performing access control list (ACL) generation 230 to generate an access control list (ACL) that specifies one or more access levels for the one or more other users.

Figure 2B:
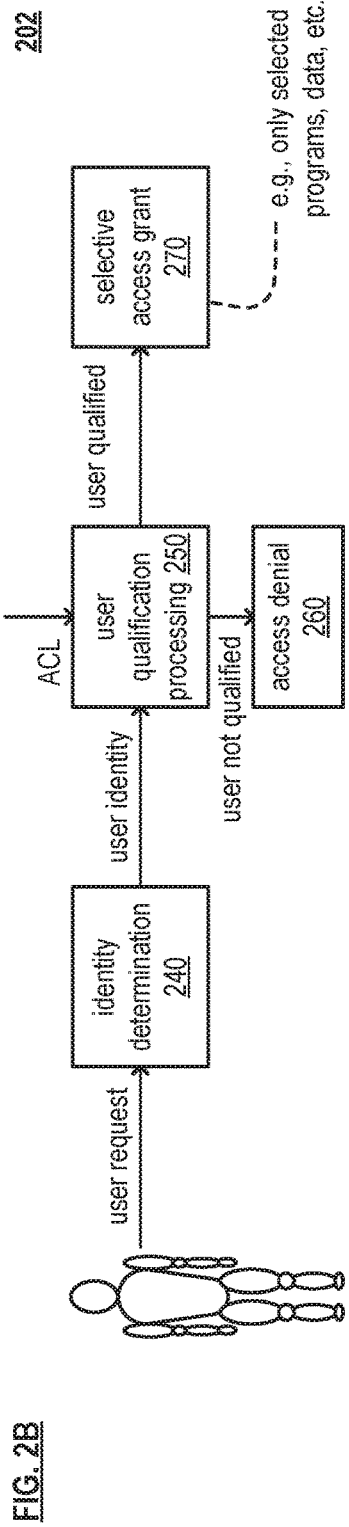
FIG. 2B is a diagram illustrating an embodiment of ACL related selective access grant functionality and processing according to various embodiments of the present invention.

FIG. 2B is a diagram illustrating an embodiment 202 of ACL related selective access grant functionality and processing according to various embodiments of the present invention. The ACL related selective access grant functionality and processing operates by performing identify determination 240 based on a user request associated with a user of one or more other users to access the existing data content on the computing device and/or one or more applications on the computing device (and/or external data). The identify determination 240 operates to determine identity of the user associated with the user request.

Then, the ACL related selective access grant functionality and processing operates by performing user qualification processing 250 in accordance with an ACL (e.g., such as generated in accordance with and with reference to FIG. 2A). When the user associated with the user request qualifies for at least some access to the computing device based on the identity of the user associated with the user request and the ACL in accordance with the user qualification processing 250, the ACL related selective access grant functionality and processing operates by performing selective access grant 270 selectively to authorize access to at least one portion of the existing data content on the computing device and/or at least one application of the one or more applications on the computing device to the user associated with the user request in accordance with a corresponding access level of the plurality of access levels specified by the ACL that is associated with the user associated with the user request. Alternatively, When the user associated with the user request fails to qualify for at least some access to the computing device based on the identity of the user associated with the user request and the ACL in accordance with the user qualification processing 250, the ACL related selective access grant functionality and processing operates by performing access denial 260. This may also involve generating an unauthorized access request notification for the owner of the computing device.

In an example of operation, the system operates automatically to generate collaboration statistics based on the previously downloaded or existing contents on a computing device. Some example of contents may include 42 emails out of 300 emails on the user 1/owner's computing device that has user 2 in the thread, and 7 pictures out of 500 pictures on the user 1/owner's computing device have user 2 in them. Based on this example, a collaboration statistic of 0.68 is generated for the user 2 in reference to the user 1/owner of the computing device by the system. The system then operates to leverage the unique collaboration statistics between a user 1/owner of the computing device and one or more other users to determine overall ACL for the computing device.

This novel system allows one or more qualified users to access the computing device temporarily without the need to manually add the user to the device with a given ACL. This provides better secure data and contents of the device when ACL is determined using dynamically calculated collaboration statistics.

Figure 2C:
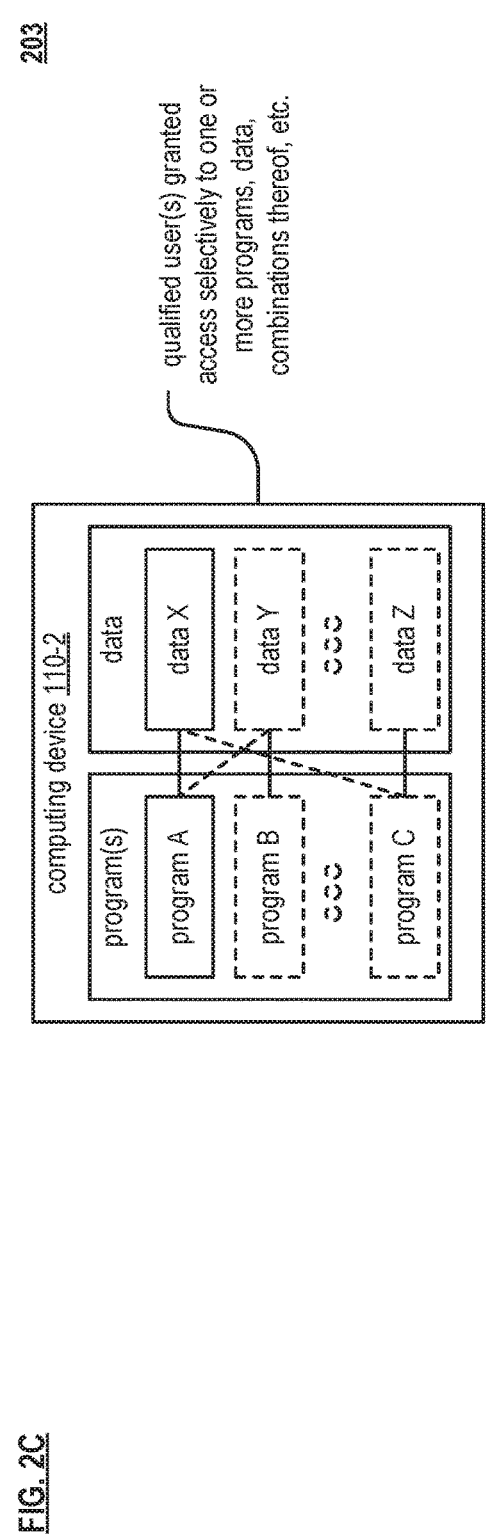
FIG. 2C is a diagram illustrating an embodiment of a computing device according to various embodiments of the present invention.

FIG. 2C is a diagram illustrating an embodiment 203 of a computing device 110-2 according to various embodiments of the present invention. The computing device 110-2 includes one or more programs (e.g., program A, and optionally program B and up to program C) and data (e.g., data X, and optionally data Y up to data Z) stored thereon. The system operates to provide one or more qualified users access selectively to one or more programs, data, and/or combination thereof. In one example, a user 1 is selectively granted access to program A and data X. In another example, a user 1 is selectively granted access to program A and data X and Y while a user 2 is selectively granted access to program B and data Y. In yet another example, a user 3 is selectively granted access to all programs A-C and only data X. Any desired combination of selective access to programs and/or data on the computing device 110-2 may be selectively granted to any number of qualified users, and the different respective qualified users may be provided different respective selective access to different combinations of programs and/or data.

In an example of operation and implementation, a computing device includes an interface configured to interface and communicate with a communication system, memory that stores operational instructions, and processing circuitry operably coupled to the interface and to the memory to perform various operations, functions, etc. including transmitting and receiving of signals, processing of signals, etc., among other operations. The computing device is configured to generate collaboration data between an owner of the computing device and a plurality of other users based on existing data content on the computing device. The computing device is also configured to process the collaboration data to generate a plurality of collaboration measures associated with the plurality of other users. Then, the computing device is configured to generate, based on the plurality of collaboration measures, an access control list (ACL) that specifies a plurality of access levels for the plurality of other users. Then, based on a user request associated with a user of the plurality of other users to access at least one of the existing data content on the computing device or one or more applications on the computing device, the computing device is configured to determine identity of the user associated with the user request. When the user associated with the user request qualifies for at least some access to the computing device based on the identity of the user associated with the user request and the ACL, selectively authorize access to at least one of a portion of the existing data content on the computing device or at least one application of the one or more applications on the computing device to the user associated with the user request in accordance with a corresponding access level of the plurality of access levels specified by the ACL that is associated with the user associated with the user request.

In some examples, when the user associated with the user request fails to qualify for at least some access to the computing device based on the identity of the user associated with the user request and the ACL, the computing device is also configured to deny all access of the computing device to the user associated with the user request and generate an unauthorized access request notification for the owner of the computing device.

In even other examples, the computing device is also configured to determine identity of the user associated with the user request based on log on of the user, username and password of the user, photo identify of the user, fingerprint of the user, name of the user, email address of the user, password of the user, facial scan of the user, email login information, and/or social media login information of the user.

Also, note that the computing device may alternatively be configured to or also be configured to identify, based on the identity of the user associated with the user request, a first application of the one or more applications on the computing device of which to generate first collaboration data and then process first data content of the existing data content on the computing device that is associated with the first application to generate first collaboration data associated with the owner of the computing device and the user associated with the user request. The computing device may also be configured to identify, based on the identity of the user associated with the user request, a second application of the one or more applications on the computing device of which to generate second collaboration data and to process second data content of the existing data content on the computing device that is associated with the second application to generate second collaboration data associated with the owner of the computing device and the user associated with the user request. The computing device is then configured to process the first collaboration data and the second collaboration data to generate a collaboration measure of the plurality of collaboration measures that is associated with the user associated with the user request.

Note that, in some examples, a first access level of the plurality of access levels specifies access to at least one of a first portion of the existing data content on the computing device, a first application of the one or more applications on the computing device, or a first time period of access to the computing device for a first user of the plurality of other users. Also, a second access level of the plurality of access levels specifies access to at least one of a second portion of the existing data content on the computing device, a second application of the one or more applications on the computing device, or a second time period of access to the computing device for a second user of the plurality of other users.

Note also that the existing data content on the computing device may come from any of a variety of sources including, but not limited to, photos, emails, chat messages, short message service (SMS) messages, phone calls, notes, contacts, and/or calendar entries, among other sources of existing data content.

In certain examples, the collaboration based ACL generation and operation technology related to computing devices as described herein may be viewed as operating such that the system generates collaboration data for a user (e.g., such as a potential user of a computing device). The collaboration data may be collected by the system via a collaboration data collecting module of one or more computing devices. The collaboration data collecting module collects data related to users from various software on the device. The system then determines the given user's identity (e.g., information, etc.) such as via any one of more of log on of the user, username and password of the user, photo identify of the user, fingerprint of the user, name of the user, email address of the user, password of the user, facial scan of the user, email login information, and/or social media login information of the user. In some examples, this identity determination can be determined by scanning the user's fingerprint or using the camera on the device to face scan the user. Note that any of a variety of means may be used to help determine the user's unique information based on user's fingerprint or picture in the camera. Optionally and in other examples, the system could allow the user to access an email app or Facebook app and log in to confirm their identify, or use facial recognition camera scans the user and matches the user to pictures on the main users Facebook or photos on the phone to identify the user and user's relationship to the owner of the device.

Then, the system operates by determining software on the computing device, if any, for which the data collecting module should collect data. Examples of the software may include any one or more of photos, emails, chats, SMSs, phones, notes, contacts, calendar entries, etc. the system then operates by generating collaboration data by collecting data from each of the software that involves the user of interest. Examples of the software may include any one or more of the data that can be collected such as emails, photos, etc. A specific example includes 47 emails out of 300 emails total in the yahoo email account, 0 email out of 500 emails total in the Gmail email account, 7 pictures out of 500 pictures in the photo software, etc.

Then, based on the collaboration data, the system generates the collaboration statistics for the user. The system contains one or more methods by which to generate the collaboration statistics. The algorithm can be based on each of the software category and user's involvement level for each software category on the computing device.

In some examples, the system may choose to generate the collaboration statistics for each software category first, and based on statistics for each category to generate overall a collaboration statistics. Considering the specific example above, 47 out of 300 emails has a collaboration statistics of 0.157, and 7 pictures out of 500 pictures in the photo software has a collaboration statistics of 0.014.

In certain examples, the overall collaboration statistics can be based on the aggregation of each of the collaboration statistics for each software category in 2.2. For example, 47 out of 300 emails has a collaboration statistics of 0.157, and 7 pictures out of 500 pictures in the photo software has a collaboration statistics of 0.014. If the user has no other collaboration statistics from other software, the overall collaboration statistics is 0.086.

Once the collaboration statistics is generated for the user, the system grants the corresponding ACL(s) based on the collaboration statistics. For example, the system may be optimized to grant the user's corresponding ACLs based on collaboration statistics for each software category. This would allow more fine-grained ACLs for better security purpose.

The system then is configured to authorize the users to use the computing device, based on the granted ACLs for the user. As such, the system would disable default log on to many software applications/programs within the computing device when switching to the new user. Also, in some examples, the system is further configured to restrict the length of time of the user's authorization to the given computing device based on the collaboration statistics and granted ACLs level. For a specific example, low collaboration statistics (e.g., under 0.1) may be permitted to use the computing device with the granted ACLs level for 10 minutes.

The system may optionally be configured to cache the user's collaboration statistics and ACLs thus they can be reused the next time the user uses the computing device. The system would likely want to refresh the cache at a reasonable interval to ensure the user's collaboration statistics and ACLs are still accurate. The interval can be tuned based on the collaboration statistics, e.g. lower collaboration statistics may have a high frequency interval as it likely to change more often. User can always manually request to refresh the collaboration statistics thus get the new ACLs that is based on the new collaboration statistics.

Figure 3:
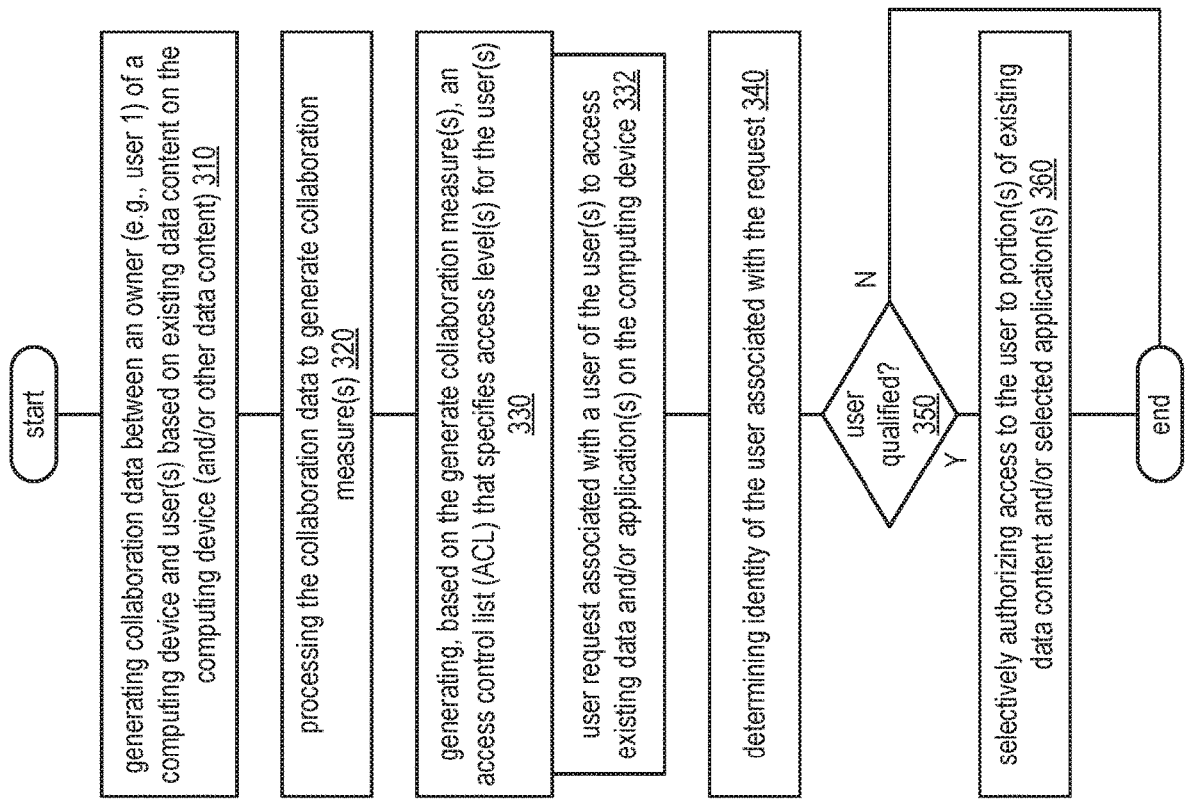
FIG. 3 is a diagram illustrating an embodiment of a method for execution by one or more computing devices according to various embodiments of the present invention.

FIG. 3 is a diagram illustrating an embodiment of a method 300 for execution by one or more computing devices according to various embodiments of the present invention. The method 300 operates in step 310 by generating collaboration data between an owner of the computing device (e.g., a user 1) and a plurality of other users (or one or more other users such as a user 2 up to a user n) based on existing data content on the computing device. The method 300 then operates in step 320 by processing the collaboration data to generate a plurality of collaboration measures associated with the plurality of other users.

The method 300 continues in step 330 by generating, based on the plurality of collaboration measures, an access control list (ACL) that specifies a plurality of access levels (or one or more access levels) for the plurality of other users (or one or more users).

Then, based on a user request associated with a user of the plurality of other users to access at least one of the existing data content on the computing device or one or more applications on the computing device as shown in step 332, the method 300 continues in step 340 by determining identity of the user associated with the user request.

When the user associated with the user request qualifies for at least some access to the computing device based on the identity of the user associated with the user request and the ACL in step 350, the method 300 operates in step 360 by selectively authorizing access to at least one of a portion of the existing data content on the computing device or at least one application of the one or more applications on the computing device to the user associated with the user request in accordance with a corresponding access level of the plurality of access levels specified by the ACL that is associated with the user associated with the user request. Alternatively, when the user associated with the user request fails to qualify for at least some access to the computing device based on the identity of the user associated with the user request and the ACL in step 350, the method 300 ends. In an alternative embodiment, when the user associated with the user request fails to qualify for at least some access to the computing device based on the identity of the user associated with the user request and the ACL in step 350, the method operates by denying all access of the computing device to the user associated with the user request and generate an unauthorized access request notification for the owner of the computing device.

Figure 4:
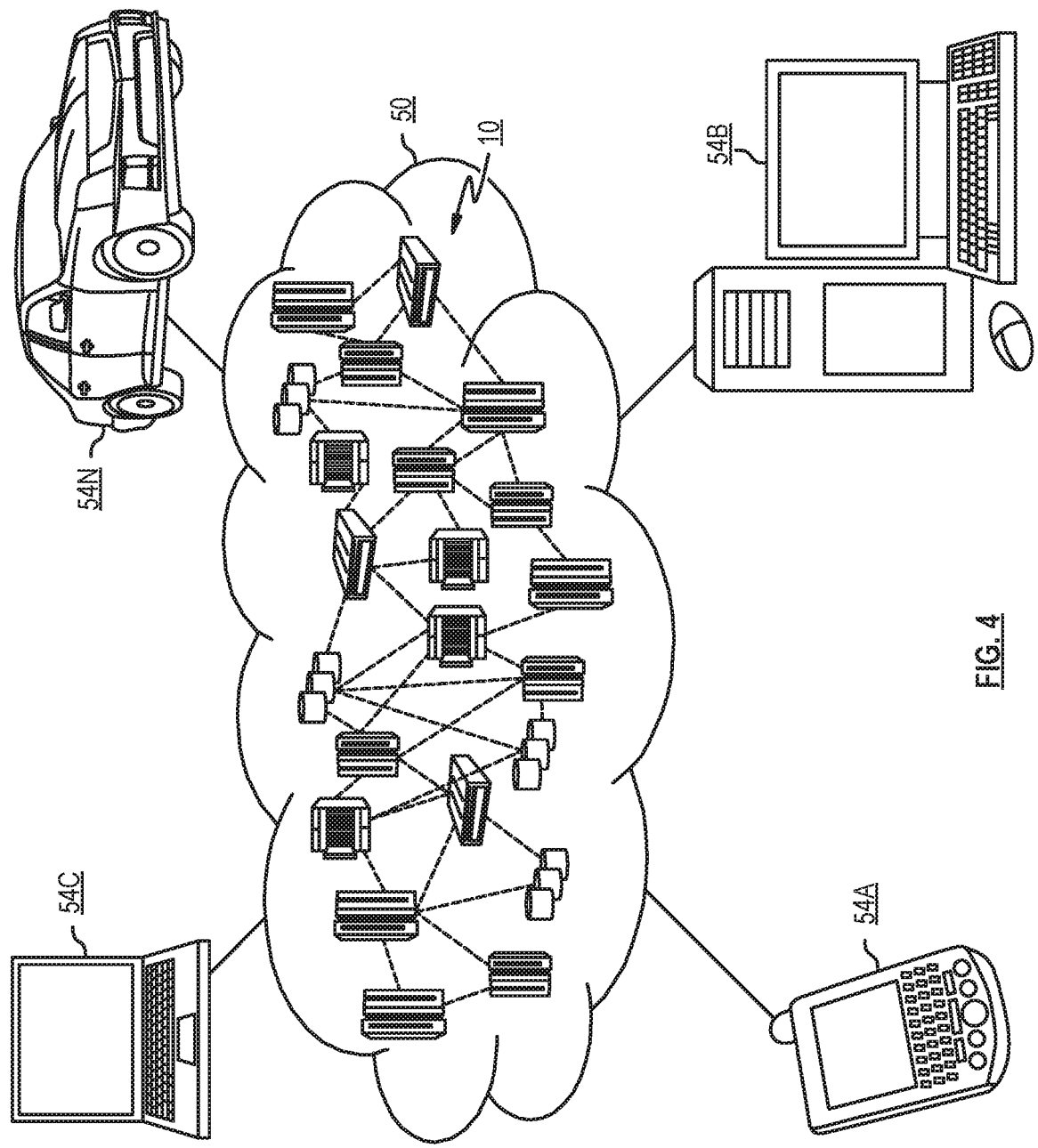
FIG. 4 depicts a cloud computing environment according to various embodiments of the present invention.

FIG. 4 depicts a cloud computing environment according to various embodiments of the present invention. FIG. 4 presents an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
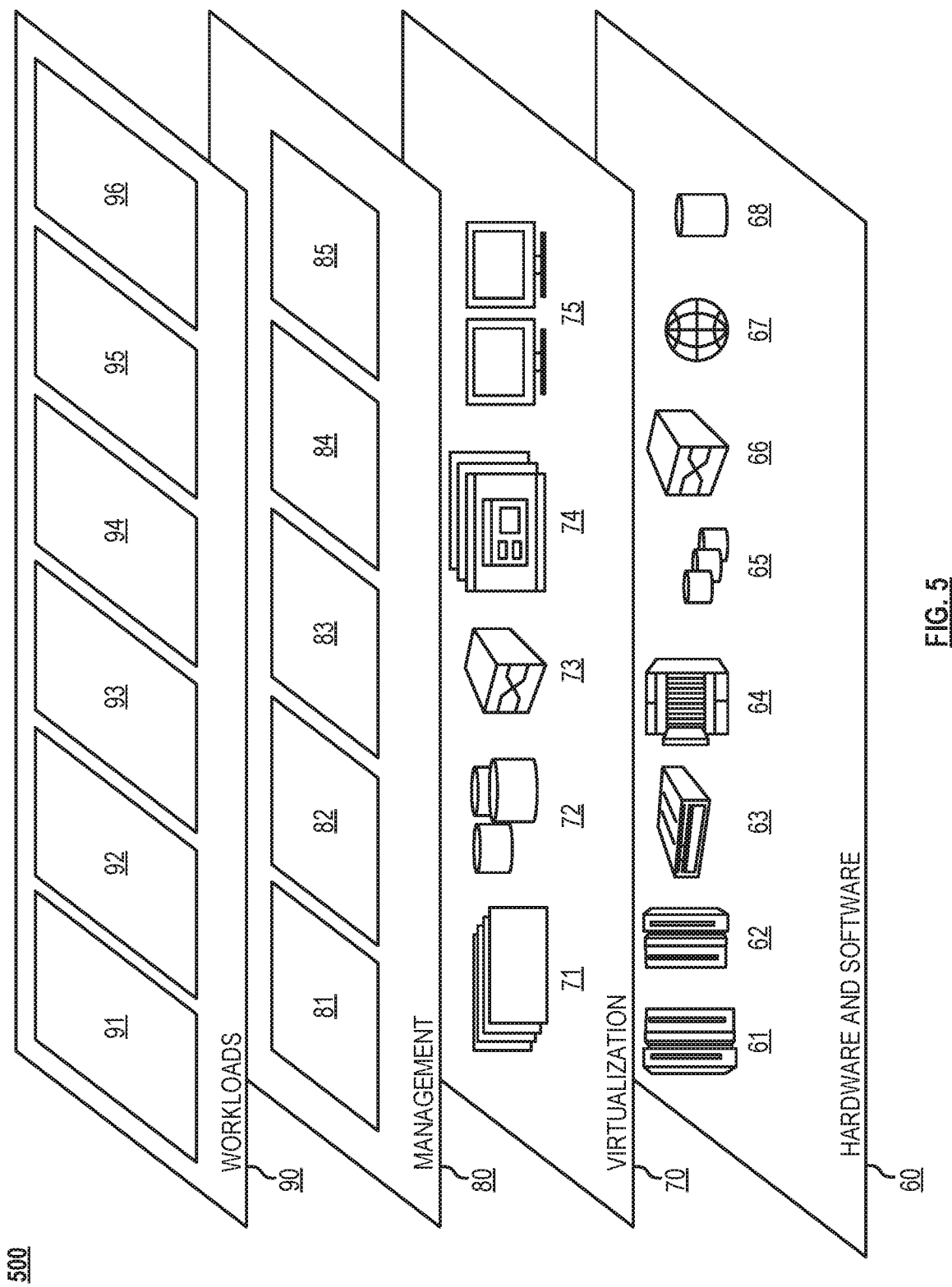
FIG. 5 depicts abstraction model layers according to various embodiments of the present invention.

FIG. 5 depicts abstraction model layers according to various embodiments of the present invention. Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, one or more hardware components can be implemented by utilizing the computing device 601 of FIG. 6.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaboration based access control list (ACL) generation and operation processing 96.

Figure 6:
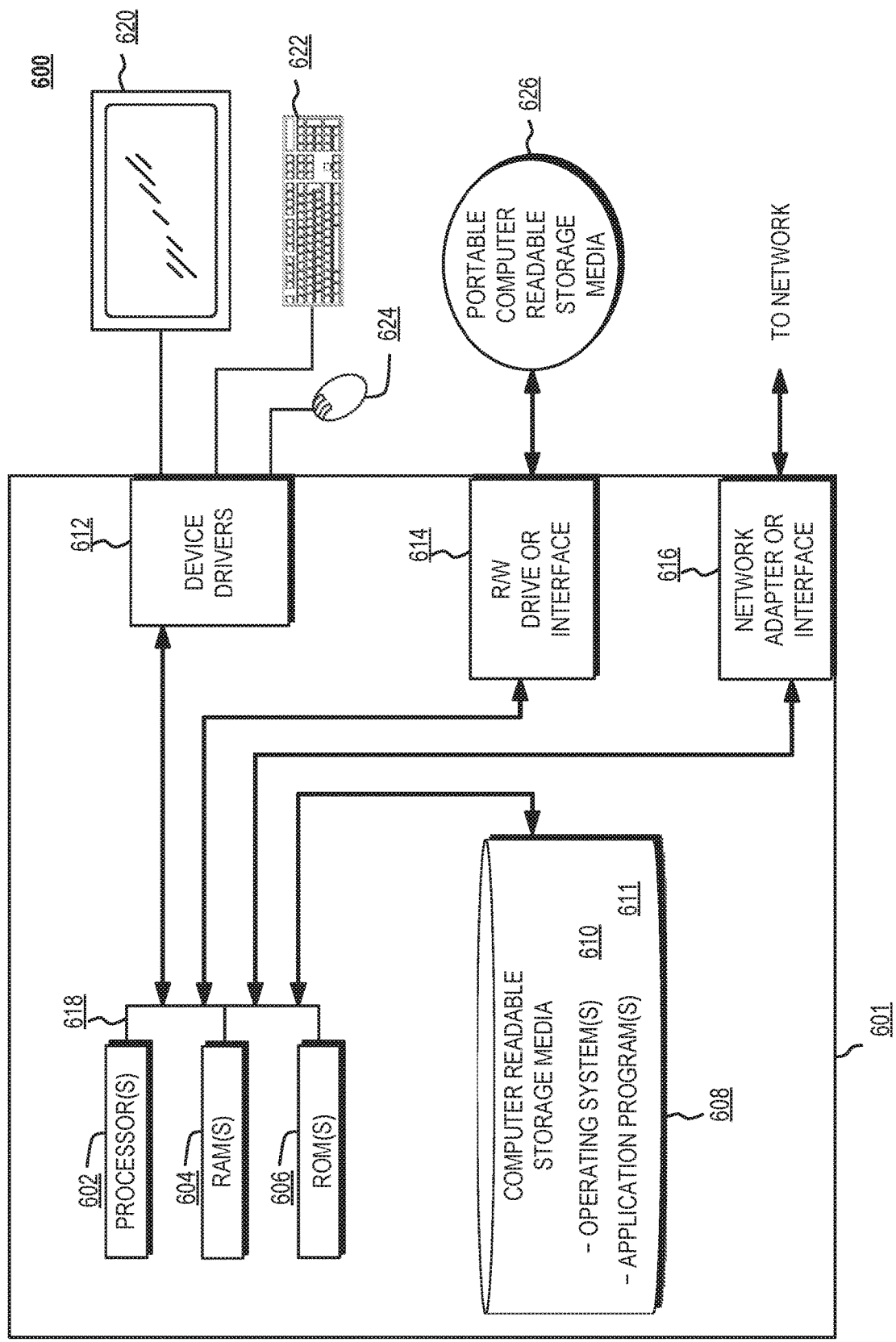
FIG. 6 depicts a block diagram of a computing device according to various embodiments of the present invention.

FIG. 6 depicts a block diagram 600 of a computing device according to various embodiments of the present invention. FIG. 6 depicts a block diagram of components of a computing device 601, which can be utilized to implement some or all of the cloud computing nodes 10, some or all of the computing devices 54A-N of FIG. 4, and/or to implement other computing devices described herein in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device 601 can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610 and/or application programs 611, such as network application server software 67 and database software 68, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 601 can also include a R/W drive or interface 614 to read from and write to one or more portable computer readable storage media 626. Application programs 611 on computing devices 601 can be stored on one or more of the portable computer readable storage media 626, read via the respective R/W drive or interface 614 and loaded into the respective computer readable storage media 608.

Computing device 601 can also include a network adapter or interface 616, such as a TCP/IP adapter card or wireless communication adapter. Application programs 611 on computing devices 54A-N can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

Computing device 601 can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
    an interface configured to interface and communicate with a communication system;
    memory that stores operational instructions; and
    processing circuitry operably coupled to the interface and to the memory, wherein the processing circuitry is configured to execute the operational instructions to:
        generate collaboration data between an owner of the computing device and a plurality of other users based on existing data content on the computing device;
        process the collaboration data to generate a plurality of collaboration measures associated with the plurality of other users;
        generate, based on the plurality of collaboration measures, an access control list (ACL) that specifies a plurality of access levels for the plurality of other users; and
        based on a user request associated with a user of the plurality of other users to access at least one of the existing data content on the computing device or one or more applications on the computing device:
            determine identity of the user associated with the user request; and
            when the user associated with the user request qualifies for at least some access to the computing device based on the identity of the user associated with the user request and the ACL, selectively authorize access to at least one of a portion of the existing data content on the computing device or at least one application of the one or more applications on the computing device to the user associated with the user request in accordance with a corresponding access level of the plurality of access levels specified by the ACL that is associated with the user associated with the user request.

2. The computing device of claim 1, wherein the processing circuitry is further configured to execute the operational instructions to:
    when the user associated with the user request fails to qualify for at least some access to the computing device based on the identity of the user associated with the user request and the ACL, deny all access of the computing device to the user associated with the user request and generate an unauthorized access request notification for the owner of the computing device.

3. The computing device of claim 1, wherein the processing circuitry is further configured to execute the operational instructions to:
    determine identity of the user associated with the user request based on at least one of log on of the user, username and password of the user, photo identify of the user, fingerprint of the user, name of the user, email address of the user, password of the user, facial scan of the user, email login information, or social media login information of the user.

4. The computing device of claim 1, wherein the processing circuitry is further configured to execute the operational instructions to:
    identify, based on the identity of the user associated with the user request, a first application of the one or more applications on the computing device of which to generate first collaboration data;
    process first data content of the existing data content on the computing device that is associated with the first application to generate first collaboration data associated with the owner of the computing device and the user associated with the user request;

identify, based on the identity of the user associated with the user request, a second application of the one or more applications on the computing device of which to generate second collaboration data;

process second data content of the existing data content on the computing device that is associated with the second application to generate second collaboration data associated with the owner of the computing device and the user associated with the user request; and process the first collaboration data and the second collaboration data to generate a collaboration measure of the plurality of collaboration measures that is associated with the user associated with the user request.

5. The computing device of claim 1, wherein the ACL includes:

a first access level of the plurality of access levels specifies access to at least one of a first portion of the existing data content on the computing device, a first application of the one or more applications on the computing device, or a first time period of access to the computing device for a first user of the plurality of other users; and a second access level of the plurality of access levels specifies access to at least one of a second portion of the existing data content on the computing device, a second application of the one or more applications on the computing device, or a second time period of access to the computing device for a second user of the plurality of other users.

6. The computing device of claim 1, wherein the existing data content on the computing device includes at least one of photos, emails, chat messages, short message service (SMS) messages, phone calls, notes, contacts, or calendar entries.

7. The computing device of claim 1 further comprising:

a wireless smart phone, a cellular phone, a laptop, a personal digital assistant, a tablet, a personal computers (PC), a work station, or a video game device.

8. The computing device of claim 1, wherein the communication system includes at least one of a wireless communication system, a wire lined communication system, a non-public intranet system, a public internet system, a local area network (LAN), a wireless local area network (WLAN), a wide area network (WAN), a satellite communication system, a fiber-optic communication system, or a mobile communication system.

9. A computing device comprising:

an interface configured to interface and communicate with a communication system;

memory that stores operational instructions; and processing circuitry operably coupled to the interface and to the memory, wherein the processing circuitry is configured to execute the operational instructions to:

generate collaboration data between an owner of the computing device and a plurality of other users based on existing data content on the computing device that includes at least one of photos, emails, chat messages, short message service (SMS) messages, phone calls, notes, contacts, or calendar entries;

process the collaboration data to generate a plurality of collaboration measures associated with the plurality of other users;

generate, based on the plurality of collaboration measures, an access control list (ACL) that specifies a plurality of access levels for the plurality of other users, wherein:

a first access level of the plurality of access levels specifies access to at least one of a first portion of the existing data content on the computing device, a first application of one or more applications on the computing device, or a first time period of access to the computing device for a first user of the plurality of other users; and a second access level of the plurality of access levels specifies access to at least one of a second portion of the existing data content on the computing device, a second application of the one or more applications on the computing device, or a second time period of access to the computing device for a second user of the plurality of other users; and based on a user request associated with a user of the plurality of other users to access at least one of the existing data content on the computing device or the one or more applications on the computing device:

determine identity of the user associated with the user request based on at least one of log on of the user, username and password of the user, photo identify of the user, fingerprint of the user, name of the user, email address of the user, password of the user, facial scan of the user, email login information, or social media login information of the user; and when the user associated with the user request qualifies for at least some access to the computing device based on the identity of the user associated with the user request and the ACL, selectively authorize access to at least one of a portion of the existing data content on the computing device or at least one application of the one or more applications on the computing device to the user associated with the user request in accordance with a corresponding access level of the plurality of access levels specified by the ACL that is associated with the user associated with the user request.

10. The computing device of claim 9, wherein the processing circuitry is further configured to execute the operational instructions to:

when the user associated with the user request fails to qualify for at least some access to the computing device based on the identity of the user associated with the user request and the ACL, deny all access of the computing device to the user associated with the user request and generate an unauthorized access request notification for the owner of the computing device.

11. The computing device of claim 9, wherein the processing circuitry is further configured to execute the operational instructions to:

identify, based on the identity of the user associated with the user request, the first application of the one or more applications on the computing device of which to generate first collaboration data;

process first data content of the existing data content on the computing device that is associated with the first application to generate first collaboration data associated with the owner of the computing device and the user associated with the user request;

identify, based on the identity of the user associated with the user request, the second application of the one or more applications on the computing device of which to generate second collaboration data;

process second data content of the existing data content on the computing device that is associated with the second application to generate second collaboration data associated with the owner of the computing device and the user associated with the user request; and process the first collaboration data and the second collaboration data to generate a collaboration measure of the plurality of collaboration measures that is associated with the user associated with the user request.

12. The computing device of claim 9 further comprising:
a wireless smart phone, a cellular phone, a laptop, a personal digital assistant, a tablet, a personal computers (PC), a work station, or a video game device.

13. The computing device of claim 9, wherein the communication system includes at least one of a wireless communication system, a wire lined communication system, a non-public intranet system, a public internet system, a local area network (LAN), a wireless local area network (WLAN), a wide area network (WAN), a satellite communication system, a fiber-optic communication system, or a mobile communication system.

14. A method for execution by a computing device that is configured to interface and communicate with a communication system, the method comprising:
generating collaboration data between an owner of the computing device and a plurality of other users based on existing data content on the computing device;
processing the collaboration data to generate a plurality of collaboration measures associated with the plurality of other users;
generating, based on the plurality of collaboration measures, an access control list (ACL) that specifies a plurality of access levels for the plurality of other users; and
based on a user request associated with a user of the plurality of other users to access at least one of the existing data content on the computing device or one or more applications on the computing device:
determining identity of the user associated with the user request; and
when the user associated with the user request qualifies for at least some access to the computing device based on the identity of the user associated with the user request and the ACL, selectively authorizing access to at least one of a portion of the existing data content on the computing device or at least one application of the one or more applications on the computing device to the user associated with the user request in accordance with a corresponding access level of the plurality of access levels specified by the ACL that is associated with the user associated with the user request.

15. The method of claim 14 further comprising:
when the user associated with the user request fails to qualify for at least some access to the computing device based on the identity of the user associated with the user request and the ACL, denying all access of the computing device to the user associated with the user request and generate an unauthorized access request notification for the owner of the computing device.

16. The method of claim 14 further comprising:
determining identity of the user associated with the user request based on at least one of log on of the user, username and password of the user, photo identify of the user, fingerprint of the user, name of the user, email address of the user, password of the user, facial scan of the user, email login information, or social media login information of the user.

17. The method of claim 14 further comprising:
identifying, based on the identity of the user associated with the user request, a first application of the one or more applications on the computing device of which to generate first collaboration data;
processing first data content of the existing data content on the computing device that is associated with the first application to generate first collaboration data associated with the owner of the computing device and the user associated with the user request;
identifying, based on the identity of the user associated with the user request, a second application of the one or more applications on the computing device of which to generate second collaboration data;
processing second data content of the existing data content on the computing device that is associated with the second application to generate second collaboration data associated with the owner of the computing device and the user associated with the user request; and
processing the first collaboration data and the second collaboration data to generate a collaboration measure of the plurality of collaboration measures that is associated with the user associated with the user request.

18. The method of claim 14, wherein the existing data content on the computing device includes at least one of photos, emails, chat messages, short message service (SMS) messages, phone calls, notes, contacts, or calendar entries.

19. The method of claim 14, wherein the computing device includes a wireless smart phone, a cellular phone, a laptop, a personal digital assistant, a tablet, a personal computers (PC), a work station, or a video game device.

20. The method of claim 14, wherein the communication system includes at least one of a wireless communication system, a wire lined communication system, a non-public intranet system, a public internet system, a local area network (LAN), a wireless local area network (WLAN), a wide area network (WAN), a satellite communication system, a fiber-optic communication system, or a mobile communication system.

* * * * *